(12) United States Patent
Rye

(10) Patent No.: US 9,078,421 B1
(45) Date of Patent: Jul. 14, 2015

(54) LURE WITH SLIDABLY-OSCILLATING BLADED MEMBER

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 0 days.

(21) Appl. No.: 14/222,622

(22) Filed: Mar. 22, 2014

(51) Int. Cl.
*A01K 85/10* (2006.01)
*A01K 85/12* (2006.01)

(52) U.S. Cl.
CPC ............ *A01K 85/10* (2013.01); *A01K 85/12* (2013.01)

(58) Field of Classification Search
USPC ............ 43/42.37, 42, 42.19, 42.11, 42.12, 43/42.03, 43.16, 42.5
IPC ........................................................ A01K 85/12
See application file for complete search history.

(56) References Cited

U.S. PATENT DOCUMENTS

| | | | | |
|---|---|---|---|---|
| 842,594 | A * | 1/1907 | Van Vleck | 43/43.16 |
| 958,233 | A * | 5/1910 | Curtiss | 43/42.19 |
| 1,787,726 | A | 1/1931 | Heddon et al. | |
| 1,940,604 | A * | 12/1933 | Pflueger | 43/42.18 |
| 2,069,724 | A | 2/1937 | Pflueger | |
| 2,199,001 | A * | 4/1940 | Khoenle | 43/42.28 |
| 2,823,485 | A * | 2/1958 | Traumuller | 43/43.16 |
| 3,864,863 | A * | 2/1975 | Neal | 43/42.15 |
| 4,035,945 | A * | 7/1977 | Newman | 43/42.15 |
| 4,201,007 | A * | 5/1980 | Backstrom | 43/42.12 |
| 4,617,753 | A * | 10/1986 | Pauley et al. | 43/42.19 |
| 4,621,449 | A * | 11/1986 | Nakagawa | 43/44.83 |
| 4,658,535 | A * | 4/1987 | Anderson | 43/42.5 |
| 4,689,914 | A | 9/1987 | Quinlan | |
| 4,757,634 | A * | 7/1988 | Meixsell, Jr. | 43/43.16 |
| 4,905,402 | A * | 3/1990 | Clark | 43/43.16 |
| D328,633 | S * | 8/1992 | Terrill | D22/129 |
| 5,481,821 | A * | 1/1996 | Stanley | 43/42.13 |
| 6,349,498 | B1 * | 2/2002 | Garratt | 43/42.06 |
| 6,481,149 | B1 * | 11/2002 | Hall et al. | 43/43.16 |
| 6,691,449 | B1 * | 2/2004 | Hoben | 43/43.16 |
| D507,034 | S | 7/2005 | Robertson | |
| 7,963,066 | B2 * | 6/2011 | Perrick | 43/42.47 |
| 8,650,797 | B2 * | 2/2014 | Sugita et al. | 43/42.32 |
| D707,325 | S * | 6/2014 | Li | D22/129 |
| 2006/0191187 | A1 * | 8/2006 | Falcon | 43/44.81 |
| 2008/0307690 | A1 * | 12/2008 | Jusseit | 43/4.5 |

* cited by examiner

*Primary Examiner* — Christopher Harmon

(57) ABSTRACT

A fishing lure consists of a hook and at least one bladed member having an aperture for slidably mounting the bladed member along the shank of the hook. The bladed member enables an oscillating-type swimming motion of the lure when the lure is retrieved by an angler. The shank comprises a generally acute-angle bend located substantially away from both the eyelet and the hook point, such that the inner edge of the aperture of the bladed member is hydrodynamically confined within the acute-angle bend during retrieval of the lure, thus preventing the oscillating movement of the bladed member from interfering with an adjacent lure component. Alternatively, a permanent or removable spacer member can be used to constrain the bladed member along a predetermined section of the hook shank. The resulting oscillating movement of the bladed member creates a unique and more lifelike swimming motion of the lure.

20 Claims, 13 Drawing Sheets

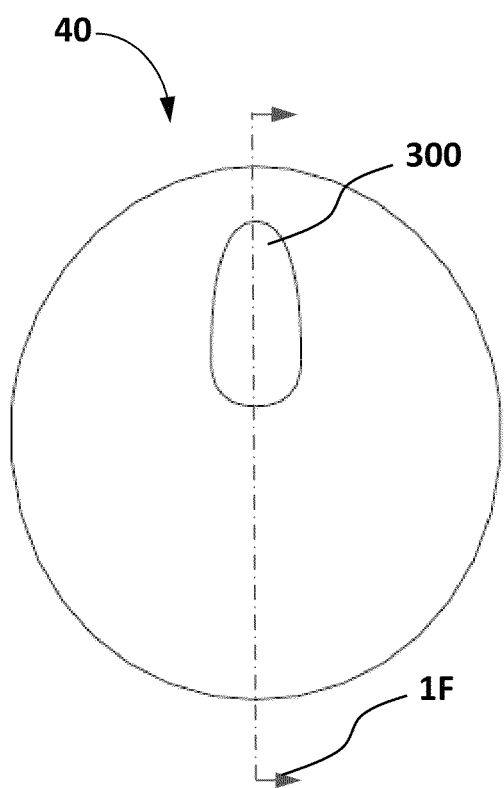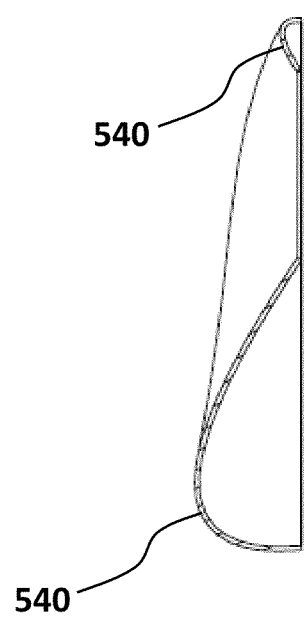
*FIG. 1E*  *FIG. 1F*

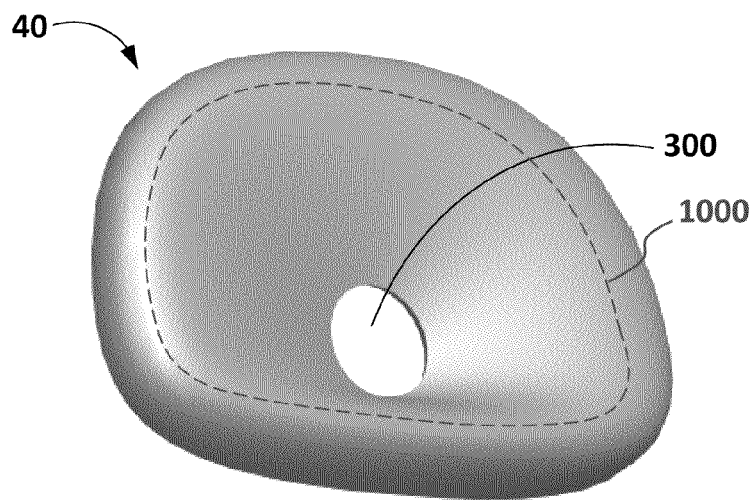
FIG. 8A
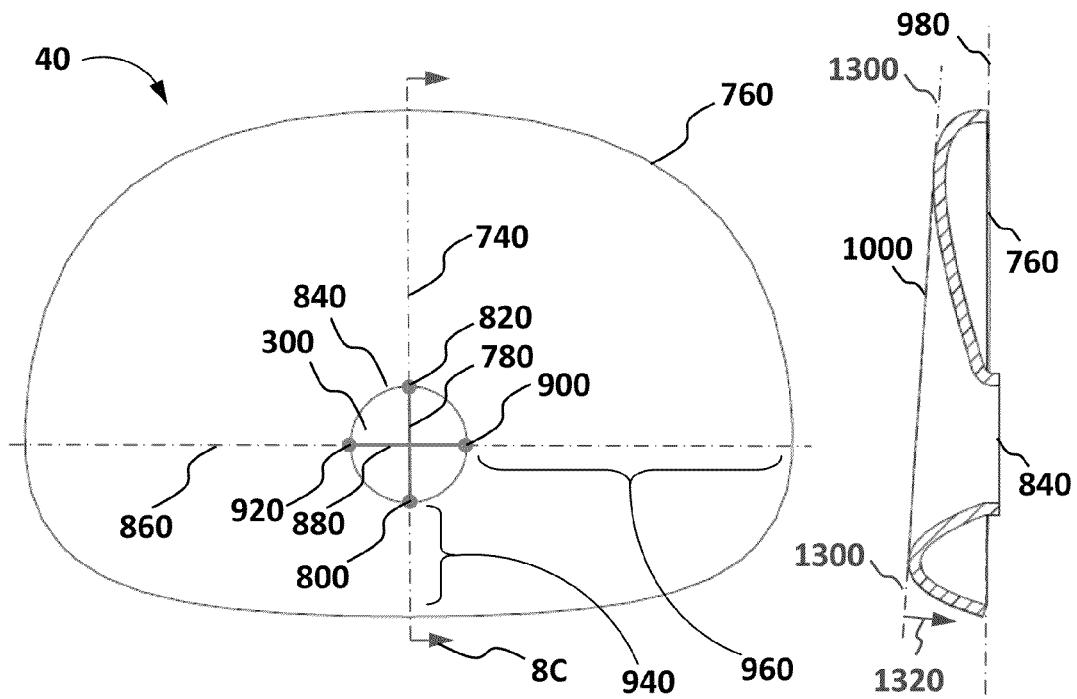
FIG. 8B  FIG. 8C

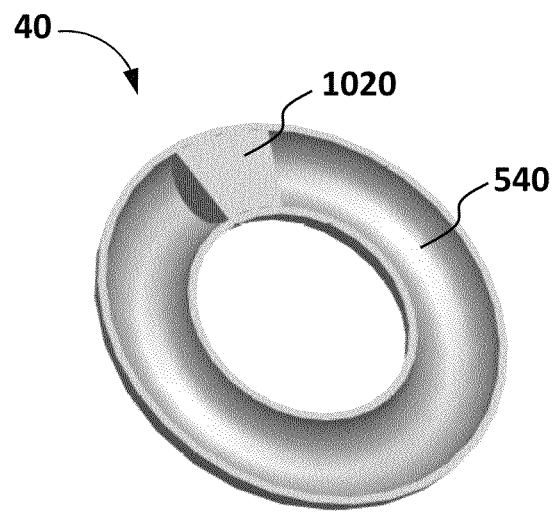
FIG. 9A
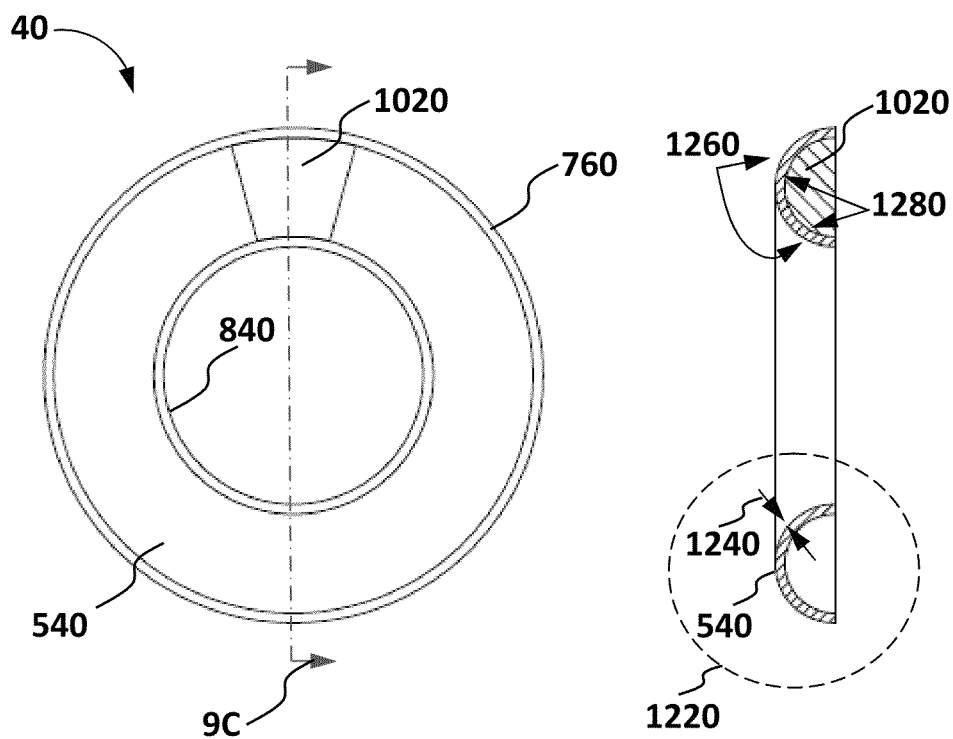
FIG. 9B  FIG. 9C

LURE WITH SLIDABLY-OSCILLATING BLADED MEMBER

BACKGROUND INFORMATION

This disclosure relates to fishing lures. More specifically, this disclosure relates to lure wherein one or more bladed members is slidably constrained within an acute-angle bend region of a hook. The slidably constrained bladed member creates a side-to-side or up-and-down type oscillating motion of the hook as the lure moves through water. The result is a fishing lure that exhibits a more lifelike swimming motion when retrieved by an angler.

Prior art means for coupling a bladed member to a hook are well known. A first end of a swivel, or a lure component enabling more than 380 degrees of rotation, is slid around the hook shank, and the opposite end of the swivel is attached to a "spinner" blade, with the spinner blade able to spin freely or continuously rotate around an imaginary axis generally parallel with the forward movement direction of the lure. While the spinner blade does act as a fish attracting element by emitting visual flash and acoustic vibration, the freely-spinning blade does not enable a side-to-side or up-and-down type motion of the lure. As a result, the lure swims in a straight path instead of moving through the water with an oscillating-type motion.

A more effective lure would better replicate the side-to-side or up-and-down tail motion of swimming prey. By using a novel-shaped hook with a bladed member directly and slidably coupled to the hook, the hydrodynamic forces around the moving lure can be utilized to cause the bladed member to locate itself in a desired acute-bend portion of the hook, thus providing a means for enabling an oscillating-type motion of the lure without the bladed member motion interfering with or striking any other component of the lure. There exists the need for a new and improved type of fishing lure wherein a slidably-attached bladed member can move with a side-to-side or up-and-down type motion as the lure is retrieved by and angler.

SUMMARY OF THE INVENTION

A fishing lure comprises at least one bladed member slidably coupled along a hook shank, with the hook shank comprising an acute-angle bend for pivotally constraining the oscillating bladed member as hydrodynamic forces act upon the moving lure. The hook shank passes wholly through an aperture in the bladed member, and the presence of the hook shank prevents the bladed member from spinning or twisting more than 380 degrees relative to the shank. A separate weighted member can be coupled to the hook in order to increase both the casting distance and fishing depth of the lure. A pre-existing elastomeric body member can additionally be attached to the hook, and one or more spacer members can be attached to the hook shank for preventing an elastomeric body member from interfering with the movements of a bladed member. Alternately, the hook shank can be shaped in such a manner that such separate spacer members are not required. An aperture of the bladed member can be shaped to allow the bladed member to be detachably mounted to the hook shank, such that an angler can attach or remove the bladed member independently of attaching or removing an elastomeric body member.

Objects and advantages of the fishing lure with slidably-oscillating bladed member are as follows:
1. The interaction of a bladed member with the surrounding water creates a side-to-side or up-and-down oscillating-type motion of the hook as the lure is retrieved.
2. The acute-angle bend of the hook shank prevents the oscillating bladed member from sliding into an adjacent component of the lure.
3. A bladed member enables the lure to exhibit additional visual flash and increased acoustical vibrations for attracting nearby fish.
4. A bladed member can be slidably attached to or removed from a hook independently of mounting or removing a pre-existing elastomeric body member to the hook.

These and other objects and advantages will become readily apparent upon review of the following specification and drawings.

BRIEF DESCRIPTION OF THE DRAWINGS

FIG. 1E is a diagrammatic front view of the bladed member of the first preferred embodiment.

FIG. 1F is a diagrammatic, median-plane section view of the bladed member of the first preferred embodiment.

FIGS. 6A-10C comprise views of alternate embodiments of a bladed member, in accordance with the present invention.

Figure 1A:
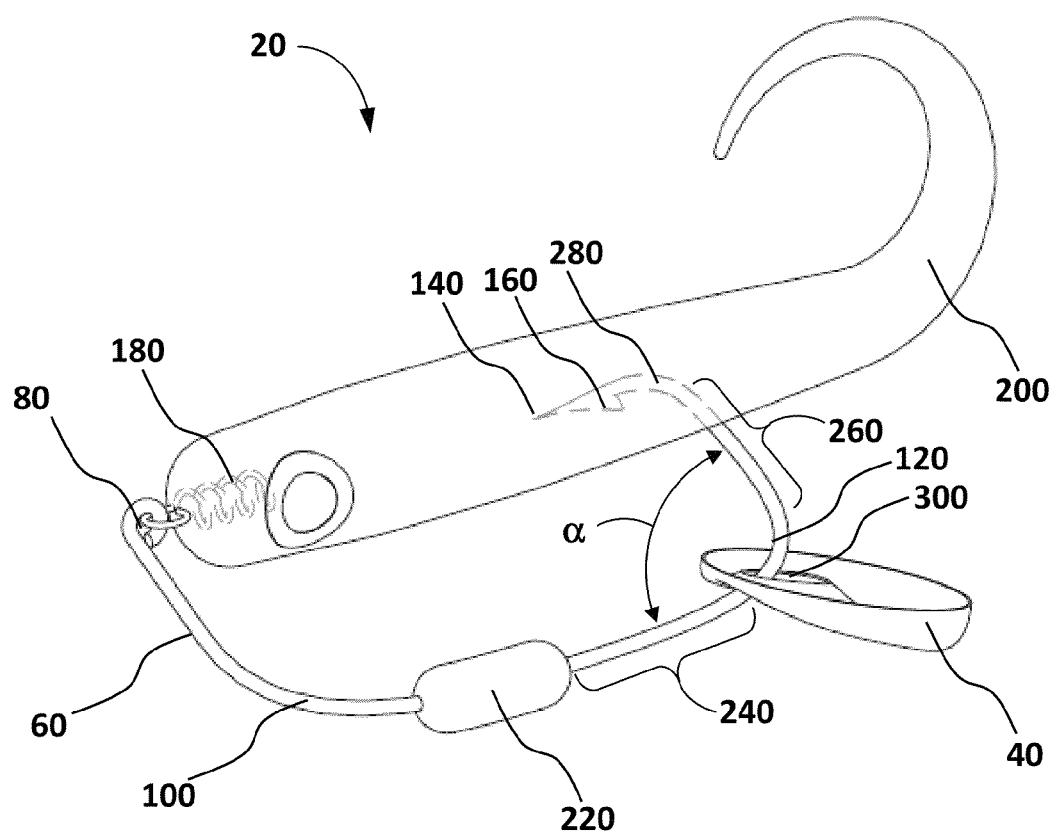
FIG. 1A is a diagrammatic perspective view of a first preferred embodiment of a lure with slidably-oscillating bladed member, in accordance with the present invention.

| Drawings-Reference Numerals | | | |
|---|---|---|---|
| 20 | lure | 40 | bladed member |
| 60 | hook | 80 | eyelet |
| 100 | shank | 120 | acute-angle bend |
| 140 | hook point | 160 | barb |
| 180 | coil-wire mount | 200 | elastomeric body member |
| 220 | weighted member | 240 | first leg |
| 260 | second leg | 280 | obtuse-angle bend |
| 300 | aperture | 320 | first connecting line |
| 340 | acute-angle bend vertex | 360 | obtuse-angle bend vertex |
| 380 | second connecting line | 400 | shank point |
| 420 | tangent line | 440 | first parallel line |
| 460 | second parallel line | 480 | first region |
| 500 | second region | 520 | third parallel line |

-continued

Drawings-Reference Numerals

| 540 | thin wall | 560 | second bladed member |
|---|---|---|---|
| 580 | spacer member | 600 | slotted portion |
| 620 | continuous unbroken perimeter edge | 640 | smaller portion |
| 660 | larger portion | 680 | assembly direction arrow |
| 700 | inner dimension | 720 | outer dimension |
| 740 | median plane | 760 | outer perimeter edge |
| 780 | first segment | 800 | first point |
| 820 | second point | 840 | aperture edge |
| 860 | transverse plane | 880 | second segment |
| 900 | third point | 920 | fourth point |
| 940 | first dimension | 960 | second dimension |
| 980 | first plane | 1000 | annular apex edge |
| 1020 | weighted portion | 1040 | annular height dimension |
| 1060 | aperture center point | 1080 | first section dimension |
| 1100 | second section dimension | 1120 | median plane aperture chord |
| 1140 | median plane projection dimension | 1160 | first intersection point |
| 1180 | second intersection point | 1200 | outer perimeter edge center point |
| 1220 | arch-shaped section | 1240 | predetermined thickness |
| 1260 | first-arched surface | 1280 | opposite-arched surface |
| 1300 | second plane | 1320 | common side |

DETAILED DESCRIPTION OF PREFERRED EMBODIMENTS

Figure 1B:
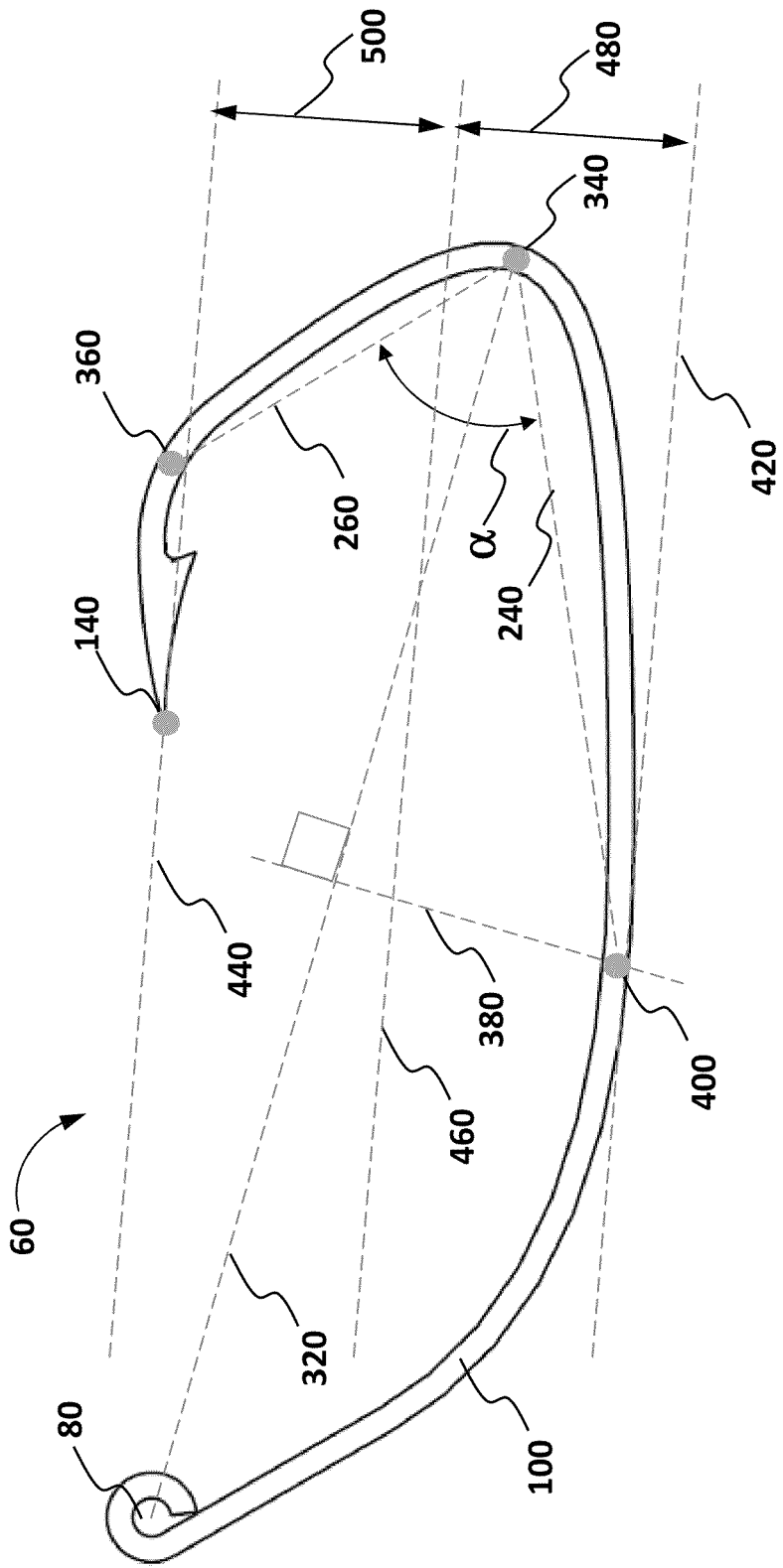
FIG. 1B is a first diagrammatic side view of the hook of the first preferred embodiment.
Figure 1C:
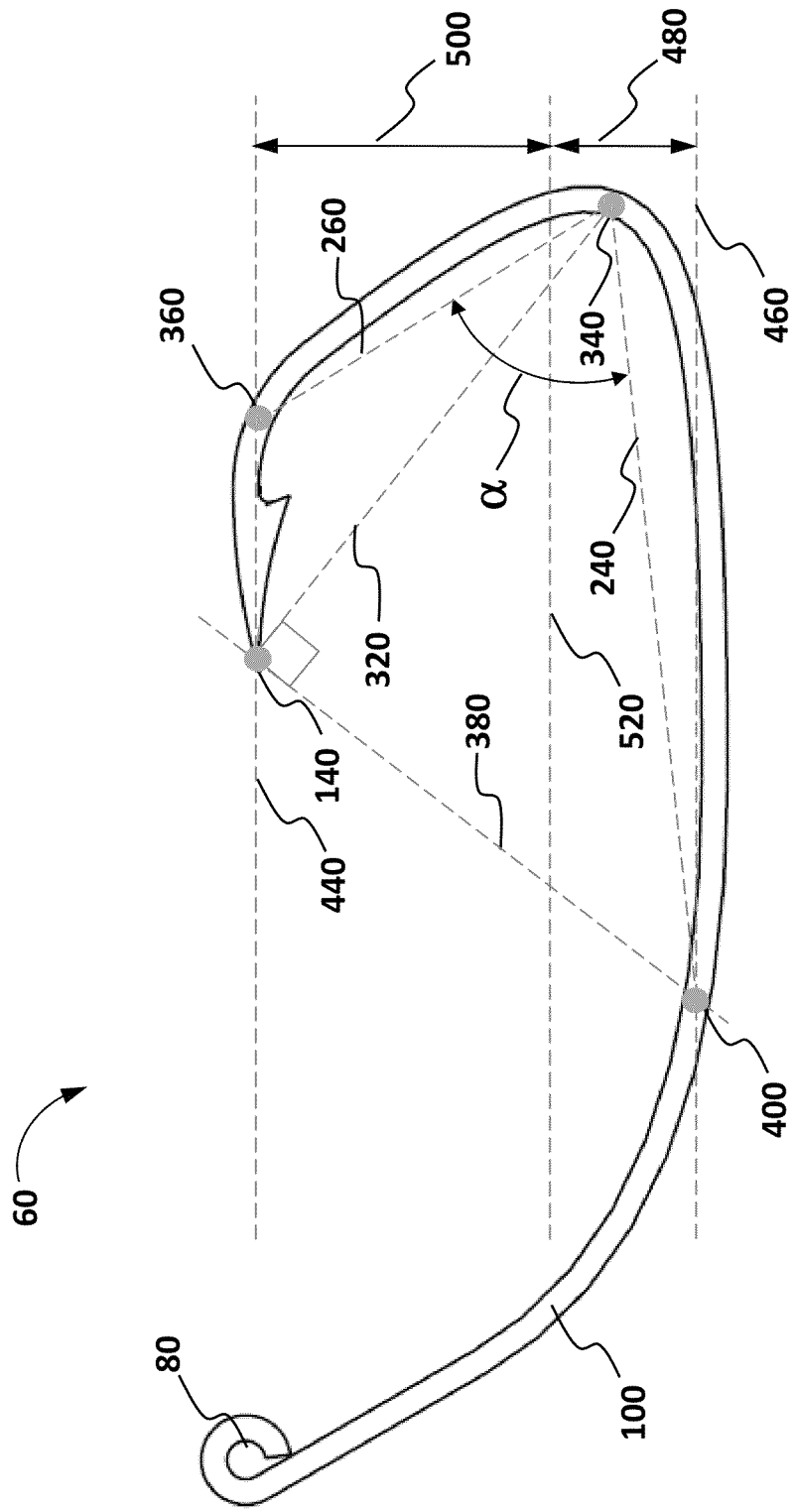
FIG. 1C is a second diagrammatic side view of the hook of the first preferred embodiment.
Figure 1D:
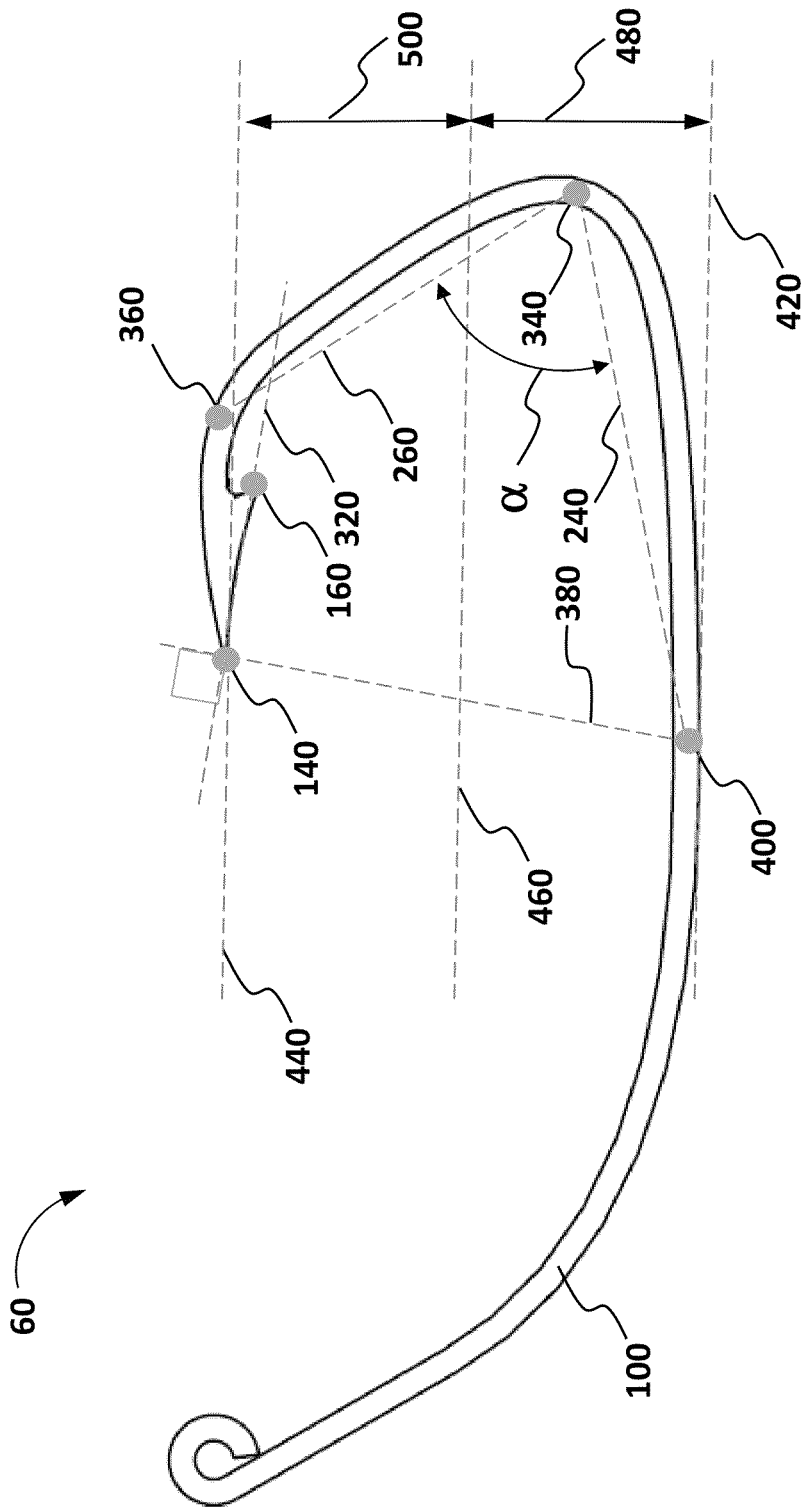
FIG. 1D is a third diagrammatic side view of the hook of the first preferred embodiment.

FIG. 1A is a first preferred embodiment of a lure 20 with slidably-oscillating bladed member 40 and shows a bladed member 40 slidably coupled along a hook 60, while FIGS. 1B-1D are side views alternatively describing a required geometry of the hook 60 of the first preferred embodiment. The hook 60 comprises an eyelet 80 for the coupling of a fishing line thereto, and the hook 60 further comprises a shank 100 having a shank thickness dimension and extending from the eyelet 80 having at least one substantial bend—the substantial bend being generally an acute-angle bend 120. The shank 100 terminates in a hook point 140, and a hook barb 160 having a barb thickness dimension terminates in a sharp tip and is commonly located immediately adjacent to the hook point 140 along the shank 100. An optional coil-wire mount 180 can be pivotally coupled to the eyelet 80, and an optional pre-existing elastomeric body member 200 can coupled to both the coil-wire mount 180 and the hook point 140. A weighted member 220 can be rigidly or loosely coupled to a section of the shank 100 anywhere between the eyelet 80 and the acute-angle bend 120 in order to increase the casting distance off the lure 20 and the depth at which the lure 20 is retrieved. The acute-angle bend 120 is positioned at a location along the shank 100 generally furthest away from the eyelet 80 than any other point along the surface of the hook 60. The two "legs" of the acute-angle bend 120 are generally the first leg 240 of the shank extending from the acute-angle bend 120 along the shank 100 in a direction towards the eyelet-end of the hook 60, while the second leg 260 of the shank 100 extends from the acute-angle bend 120 to a generally obtuse-angle bend 280 near the hook barb 160.

A bladed member 40 comprises at least one aperture 300, with the shank 100 passing wholly through the aperture 300 such that the bladed member 40 is freely and slidably coupled along the shank 100. Thus, the bladed member 40 is free to both slide along the shank 100 and sway back and forth and/or up and down, but the bladed member 40 cannot spin or rotate more than 380 degrees in a clockwise or counterclockwise direction around an imaginary axis that is parallel to a line passing through both the eyelet 80 and hook point 140—or an axis that is generally parallel with the direction of lure travel—since the presence of the shank 100 interferes with and prevents such an unlimited rotation or constant spinning motion of the bladed member 40. As a result, the bladed member 40 is confined to only be an oscillating member, and not a spinning member, of the lure 20. The acute-angle bend 120, obtuse-angle bend 280, and hook point 140 are generally all coplanar, or generally all located within a common plane, in order to provide additional stability to the moving lure 20 and prevent the lure 20 from moving undesirably in a sideways direction and/or exhibiting a twisting or spiraling motion when retrieved. An additional advantage of having the bladed member 40 be slidably mounted to the shank 100 is that the bladed member 40 can freely slide up the shank 100 after a fish bites the lure 20, such that the fighting fish cannot use the bladed member 40 as additional leverage when trying to fight free from the hook 60. Note that the shank thickness dimension is generally the diameter of the metal wire used to construct the hook 60, while the barb thickness dimension is the minimum dimension of an aperture 300 that enables a bladed member 40 to freely pass over the barb 160. It should also be noted that if the bladed member 40 is of sufficient mass to also enable the desired casting distance and fishing depth of the lure 20, then the weighted member 220 is not required in the construction of the lure 20.

The location of the acute-angle bend 120 of the shank 100 prevents the bladed member 40 from sliding up the shank 100 towards the barb 160 and interfering with the pre-existing elastomeric body member 200 as the lure 20 is retrieved, since the bladed member 40 will be pushed into, or naturally locate itself into, this acute-angle bend 120 as a result of the interaction between hydrodynamic forces and a gravitational force acting on the bladed member 40 as the lure 20 is retrieved. In other words, the bladed member 40 cannot slide up the shank 100 towards the elastomeric body member 200 due to the gravitational force acting on the bladed member, and the bladed member 40 cannot slide up the shank 100 towards the eyelet 80 due to the surrounding hydrodynamic forces acting on the moving lure 20. The sole forward motion of the lure 40 causes the oscillating bladed member 40 to be constrained within the region of the shank 100 containing the acute-angle bend 120, and this is the main advantage and primary purpose of the acute-angle bend 120. Without the acute-angle bend 120 being desirably located substantially away from the barb 160, the hydrodynamic forces from the surrounding water would push the bladed member 40 up into the elastomeric body member 200 and undesirably stop any oscillations of the bladed member 40. Although a shank 100 comprising any value of acute-angle bend 120 can be effective for preventing interference of the bladed member 40 and the elastomeric body member 200 of most lures, especially at slow retrieve speeds, the ideal value of the acute-angle bend 120 for sufficiently confining the bladed member 40 to the general region of the acute-angle bend 120 across a broader range of lure retrieval speeds is an acute angle α having a value of 75 degrees or less. Note that the acute angle α is the value of the angle generally between the first leg 240 and second leg 260, The general location of the acute-angle bend 120 can be defined geometrically through the descriptions accompanying the profile views or side views of FIG. 1B, FIG. 1C, or FIG. 1D. In FIG. 1B, a first method for defining an optimal region of the hook 60 containing the acute-angle bend 120 begins by drawing an imaginary first connecting line 320 from the center of the eyelet 80 to the acute-angle bend vertex 340. Note that the obtuse-angle bend vertex 360 is also shown for reference, and it will be further utilized in subsequent figures. Next, a second connecting line 380 perpendicularly bisects the first connecting line 320, and the second connecting line 380 intersects a shank point 400 along the surface of the shank 100 between the eyelet 80 and the acute angle bend vertex 340. A tangent line 420 is then drawn that passes generally through the shank point 400 and is generally tangent to the outer surface of the shank 100 at the location of the shank point 400. A first parallel line 440 is next drawn passing through the hook point 140 and being generally parallel to the tangent line 420. Note that the first parallel line 440 may or may not also pass through the obtuse-angle bend vertex 360. A second parallel line 460, which is parallel to both the tangent line 420 and first parallel line 440, is drawn approximately midway between the tangent line 420 and first parallel line 440. Thus, the second parallel line 460 divides the hook 60 into two regions—a first region 480 between the tangent line 420 and second parallel line 460, and a second region 500 between the first parallel line 440 and second parallel line 460. Note that the first leg 240 generally connects the acute-angle bend vertex 340 to the shank point 400, the second leg 260 generally connects the acute-angle bend vertex 340 to the obtuse-angle bend vertex 360, and the acute angle α is shown as the angle between the first leg 240 and second leg 260. With these parameters established, it can be seen that only the first region 480 generally contains the acute-angle bend vertex 340.

A separate and wholly independent geometric definition of the location of the acute-angle bend 120 can be defined by a second method. Observing the diagram of FIG. 1C, a first connecting line 320 now connects the hook point 140 and an acute-angle bend vertex 340, and a second connecting line 380 is drawn perpendicular to the first connecting line 320 and passing through the hook point 140. It should be noted here that when comparing any two figures, any geometric parameters having the same reference numeral are not necessarily drawn in the exact same orientation and with the exact same constraints and purpose. For example, a first connecting line 320 in FIG. 1C does not necessarily have the same orientation, constraints, and purpose as a first connecting line 320 in FIG. 1B or in subsequent figures. Referring again to FIG. 1C, the second connecting line 380 intersects the shank 100 at a shank point 400 located between the eyelet 80 and acute-angle bend vertex 340. A first parallel line 440 is then drawn passing through the hook point 140 and the obtuse-angle bend vertex 360. The obtuse-angle bend 280 is substantially between 90 and 180 degrees, and the obtuse-angle bend vertex 360 is also located generally closer to the eyelet 80 than the acute-angle bend vertex 340. A second parallel line 460 is parallel with the first parallel line 440 and passes through the shank point 400, with a third parallel line 520 parallel to, and positioned closer to, the second parallel line 460 and located approximately one third of the perpendicular distance between the second parallel line 460 and the first parallel line 440. A first region 480 of the hook 60 is defined as the space between the second parallel line 460 and third parallel line 520, and a second region 500 of the hook is defined as the space between the first parallel line 440 and the third parallel line 520. Note that the first leg 240 generally connects the acute-angle bend vertex 340 to the shank point 400, the second leg 260 generally connects the acute-angle bend vertex 340 to the obtuse-angle bend vertex 360, and the acute angle α is shown as the angle between the first leg 240 and second leg 260. It can be seen that the first region 480 generally contains the acute-angle bend vertex 340.

As shown in FIG. 1D, a third independent method for geometrically defining the general location of an acute-angle bend 120 begins by drawing a first connecting line 320 passing through the hook point 140 and the tip of the barb 160. Next, a second connecting line 380 is drawn perpendicular to the first connecting line 320, passing through both the hook point 140 and through an opposite point along the shank 100 at a location identified as a shank point 400. A tangent line 420 is then drawn through the shank point 400, and a first parallel line 440 is drawn passing through the hook point 140 and parallel to the tangent line 420. Note that the first parallel line 440 may or may not also pass through the obtuse-angle bend vertex 360. A second parallel line 460 is shown parallel to the first parallel line 440 and is located approximately midway between the tangent line 420 and first parallel line 440. The hook 60 thus comprises a first region 480 located between the tangent line 420 and second parallel line 460, and the hook 60 also comprises a second region 500 located between the first parallel line 440 and the second parallel line 460. Note that the first leg 240 generally connects the acute-angle bend vertex 340 to the shank point 400, the second leg 260 generally connects the acute-angle bend vertex 340 to the obtuse-angle bend vertex 360, and the acute angle α is shown as the angle between the first leg 240 and second leg 260. It is clearly shown that the acute-angle bend vertex 340 is contained within the first region 480. It should also be noted that the acute-angle bend vertex 340, located along the shank 100, generally corresponds with a maximum straight-line distance between the eyelet 80 and any point along the shank 100, such that the acute-angle bend vertex 340 is generally located further away from the eyelet 80 than any other point along the shank 100.

In FIG. 1E and FIG. 1F, a front view and median-plane section view, respectively, of the bladed member 40 of the first preferred embodiment are shown, and it can be seen that the bladed member 40 comprises a thin wall 540 and comprises a revolved section having a generally curved shape, such as a C-shaped, J-shaped, or U-shaped revolved section shape. Although the outer perimeter front view of the bladed member 40 is shown as being slightly oval, the outer perimeter shape of the revolved section can also be circular, elliptical, rectangular, or any other rounded-type or polygon-type shape. A blade aperture 300 is located within the bladed member 40, and the aperture 300 can be any shape and be generally positioned in the center of the bladed member 40, or the aperture 300 can be positioned offset to one side of the bladed member 40. A metallic material is the preferred material for making such a rigid thin-wall 540 shape, and a metallic material would naturally simultaneously possess additional light-reflecting properties for attracting fish. The revolved section varies in width along its perimeter or annular trajectory, and the revolved section also varies in thickness along its perimeter or curved trajectory. The bladed member 40 of the first preferred embodiment forms a closed-loop shape. However, a small slit can be cut through the entire wall thickness at a desired location for the detachable mounting of the bladed member onto a hook shank 100 by inserting the shank 100 entirely through the small slit until the bladed member 40 is loosely mounted and free to slide along the shank 100. The type of bladed member 40 depicted in FIGS. 1E-1F can exhibit a generally up-and-down or generally side-to-side stable oscillating-type motion as the lure 20 is retrieved, depending on the orientation of the bladed member 40 relative to the shank 100 and relative to the upright swimming orientation of the lure 20.

Figure 2A:
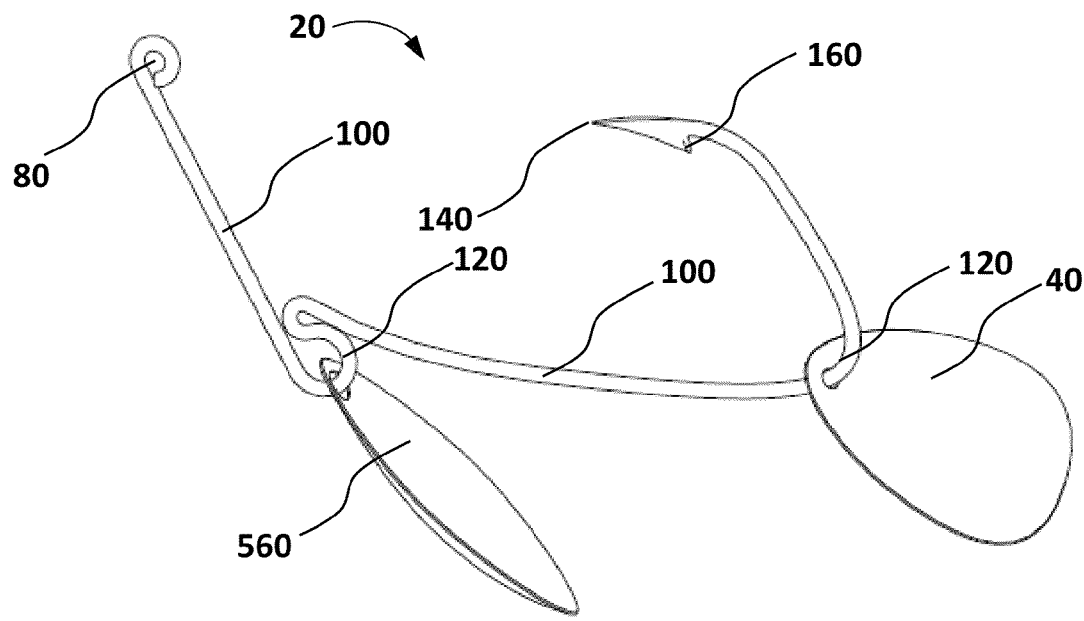
FIG. 2A is a diagrammatic perspective view of a second preferred embodiment of a lure with slidably-oscillating bladed member, in accordance with the present invention.

Turning now to FIG. 2A, a second preferred embodiment of a fishing lure 20 with slidable bladed member 40 is shown, wherein a second bladed member 560 is also slidably coupled to the shank 100 at a second location, such that two separate and independent acute-angle bends 120 are generally located in the same region of the hook 60. Advantages of using two or more bladed members 40 instead of just one are that additional acoustical vibrations and visual reflections can be emitted into the surrounding water. In addition, each bladed member 40 can be of a different shape such that a faster retrieve speed of the lure 20 causes a first bladed member 40 to oscillate with a different motion or frequency than a second bladed member 560.

Figure 2B:
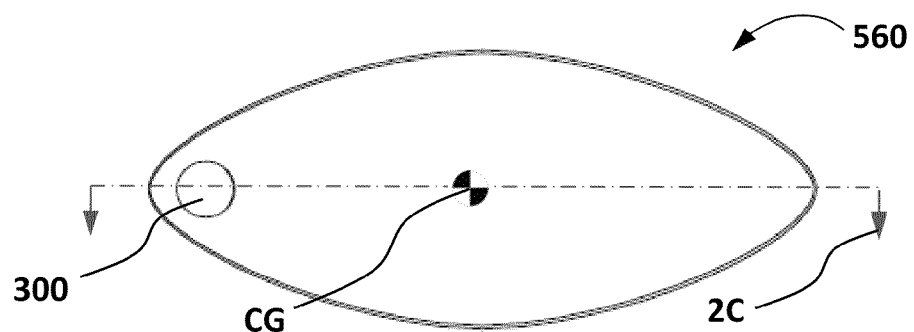
FIG. 2B is a diagrammatic front view of the bladed member of the second preferred embodiment.
Figure 2C:
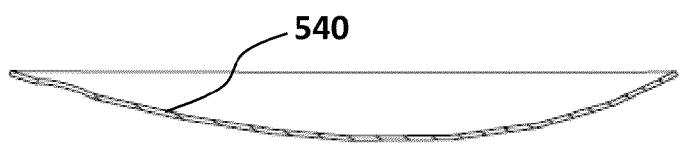
FIG. 2C is a diagrammatic, median-plane section view of the bladed member of the second preferred embodiment.

A front view and median-plane section view of the second bladed member 560 are shown in FIG. 2B and FIG. 2C, respectively. Similar to bladed members of other preferred embodiments, the second bladed member 560 comprises a thin wall 540 and a generally concave shape. A center of gravity CG is shown and is located substantially away from the aperture 300. It should be noted that the bladed members 40 and 560 are depicted with the generally concave side facing upwards during normal operation, or generally facing towards an imaginary line passing through the eyelet 80 and hook point 140. In other words, during normal lure retrieval, the concave side of a bladed member 40 is shown facing the water surface and/or the sky. Due to the interaction between a gravitational force and hydrodynamic forces acting on the bladed member 40, this "concave facing up" orientation results in a different oscillating motion of the bladed member 40 as compared to a "concave facing down" orientation, although either orientation can generate the preferred type of oscillations depending on the fishing conditions and desired behavior of the lure 20. This difference in oscillating behavior for a "concave up" or "concave down" orientation is especially true for lighter and thinner bladed members 40, since in general the heaver the bladed member 40 becomes, the less concave, or more flat, the bladed member 40 can be in order to produce the desired oscillating motion.

Figure 3:
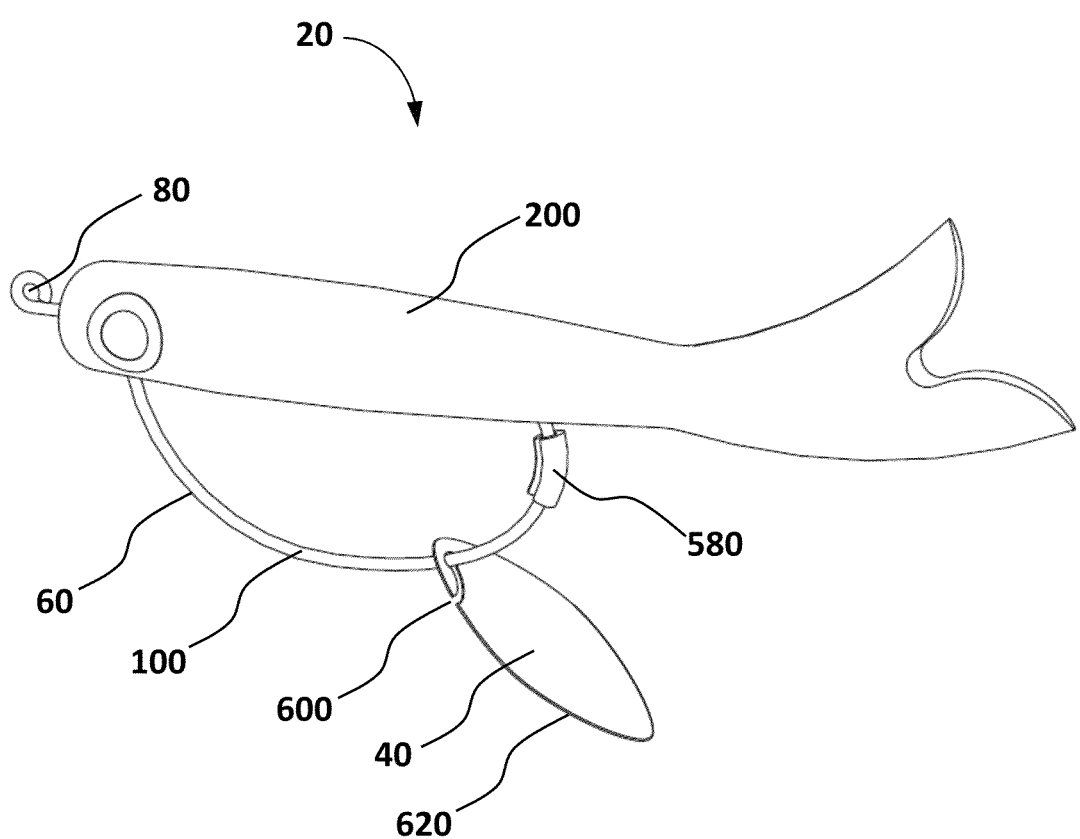
FIG. 3 is a diagrammatic perspective view of a third preferred embodiment of a lure with slidably-oscillating bladed member, in accordance with the present invention.

In FIG. 3, a third preferred embodiment of the lure 20 is shown wherein a spacer member 580 surrounds a portion of the shank 100 in order to prevent the oscillating bladed member 40 from striking the elastomeric body member 200 during lure retrieval. A spacer member 580 can be frictionally attached, slidably attached, or permanently attached to the shank 100, and a spacer member 580 can prevent an elastomeric body member 200 from interfering with the desired motion of a bladed member 40, and vice versa, especially if the hook 60 is of the type that does not comprise an acute-angle bend 120 in the first region 480 like the hook embodiment described by FIGS. 1B-1D. The aperture 300 of the bladed member 40 comprises a thin slotted portion 600 joining the aperture 300 to the outside edge of the bladed member 40, such that the aperture 300, including the slotted portion 600, is formed by a continuous unbroken perimeter edge 620 of the bladed member 40. It should be noted that the purpose and function of the slotted portion 600 shown here is the same as the function of the small slit mentioned, but not shown, in the description of FIG. 1E. That is, with the width of the slotted portion 600 being dimensioned slightly less than the thickness of the shank 100, the resulting advantage is that the bladed member 40 can be "snapped" into or "unsnapped" from the shank 100 in a sideways direction independently of the mounting of the elastomeric body member 200. This assembly direction is required because for the bladed member 40 embodiment shown, the central small hole portion of the aperture 300 is smaller in width than the dimensions of the protruding barb 160 of the hook 60, such that the bladed member 40 aperture cannot simply be slid past the barb 160 and down the shank 100 prior to frictionally attaching a tube-shaped spacer member 580 to the shank 100. Thus, in order to detachably couple a bladed member 40 of the type shown in FIG. 3 to a shank 100, the slotted portion 600 of the bladed member 40 can be pushed over or "snapped onto" the shank 100 such that the bladed member 40 is then free to slide along the shank 100, since the thin-wall 540 construction of the bladed member 40 allows slotted portion 600 to momentarily deform or bend for such a "snap onto shank" type assembly. Disassembly of the bladed member 40 is the opposite of the assembly method described above.

As an alternative to detachably assembling or frictionally assembling the tubed-shaped spacer member 580, the spacer member 580 can be permanently attached to the shank 100 by molding the spacer member 580 around the shank 100, crimping the spacer member 580 around the shank 100, or through other means known in the art. The spacer member 580 can have a generally C-shaped cross section such that it simply "clamps" around a predetermined section of the shank 100, or the spacer member 580 can have a closed-loop cross section if permanently molded around a portion of the shank 100. The spacer member 580 can also be made from an elastomeric or flexible material such that it can be frictionally slid over the hook point 140, past the barb 160, and down the shank 100 to a predetermined location or position.

Figure 4A:
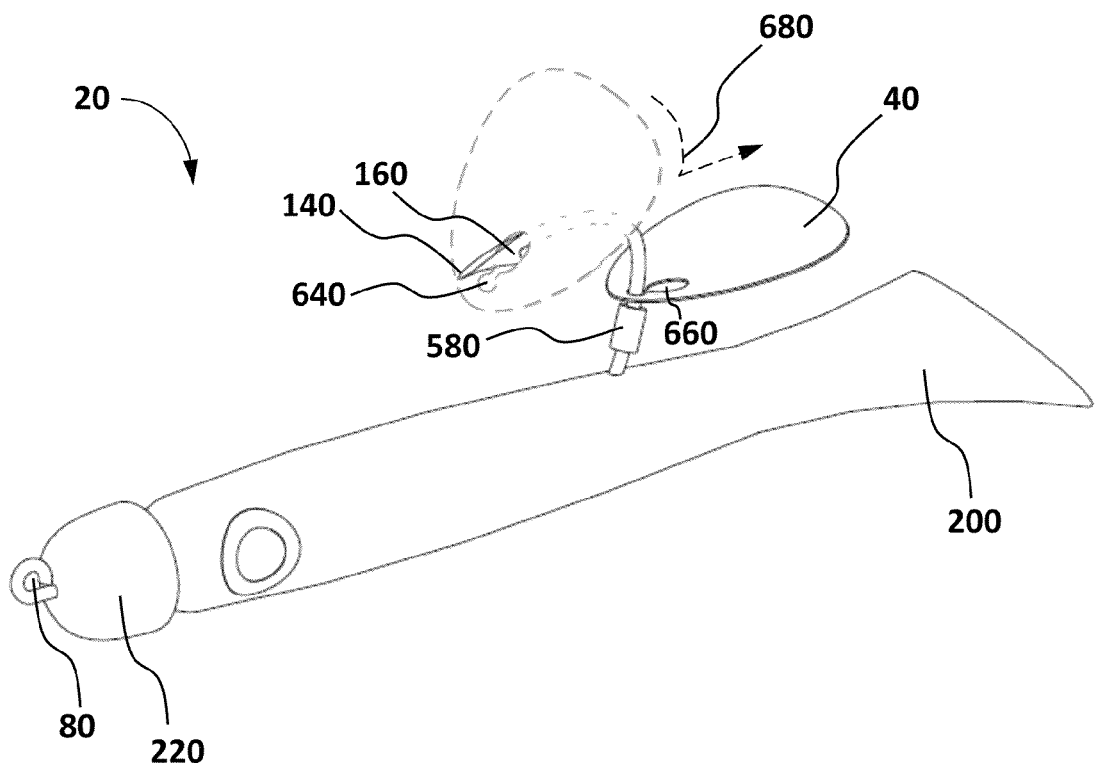
FIG. 4A is a fourth preferred embodiment of a lure with slidably-oscillating bladed member, in accordance with the present invention.
Figure 4B:
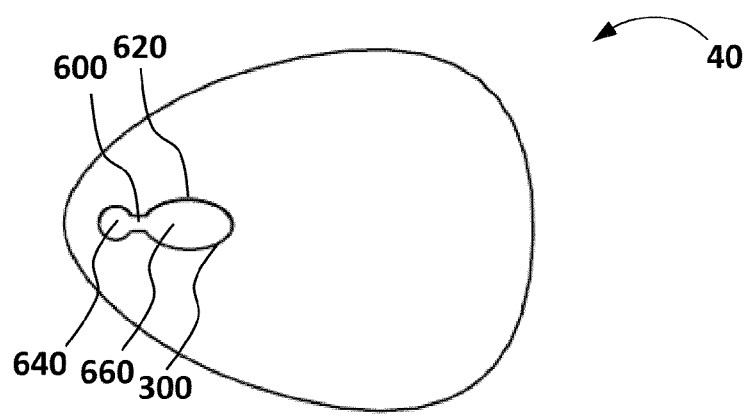
FIG. 4B is a diagrammatic front view of the bladed member of the fourth preferred embodiment.

In FIG. 4A, a fourth preferred embodiment of the lure 20 is shown having an elastomeric body member 200 that covers a substantial amount of the shank 100 and leaves the hook point 140 exposed, as compared to prior embodiments wherein the elastomeric body member 200 covers the hook point 140 and leaves most of the shank 100 exposed. As a result, the only means keeping the bladed member 40 from sliding back off of the hook 60 is the height of the barb 160. An alternate means to keep the bladed member 40 attached to the hook 60 is by having the aperture 300 of the bladed member 40 comprise a smaller portion 640 connected to a larger portion 660 by a thin slotted portion 600. Additionally detailed in FIG. 4B, a larger portion 660 of the aperture 300 is big enough to allow the bladed member 40 to slide over the barb 160 and then down the shank 100. After sliding past the barb 160, the bladed member 40 can be pushed against the shank 100 such that the thin slotted portion 600 of the aperture 300 momentarily enlarges or flexes and allows the shank 100 to snap or "click" into the smaller portion 640 of the aperture 300, and such a sequence is indicated by the assembly direction arrow 680 shown in FIG. 4A. Thus, the bladed member 40 is now loosely coupled to the shank 100 and cannot slide back past the barb 160 until an angler manually pushes or "snaps" the shank 100 back into the larger portion 660 of the aperture 300 and slides the bladed member 40 back past the barb 160 and off the hook 60. Note that an angler would need to follow these steps for temporarily removing the bladed member 40, as the bladed member 40 would need to be removed first if it were desired to replace the elastomeric body member 200 of this preferred embodiment with a new elastomeric body member 200 having a different color or shape.

Figure 5:
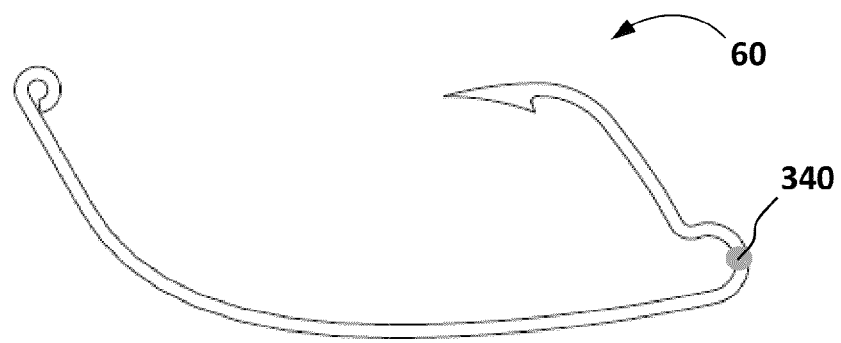
FIG. 5 is a diagrammatic side view of an alternate embodiment of a hook, in accordance with the present invention.

In FIG. 5, an alternate embodiment of a hook 60 is shown, wherein the acute-angle bend vertex 340 is generally located along a portion of a generally circular arc, which could be defined as having an approximate angle of 0 degrees. For the sake of this invention, an angle approximately equal to 0 degrees is also defined as being an acute angle, such that an arc portion of a circular or elliptical shape with a center point located in the same first region 480 as the acute-angle bend vertex 340 of FIGS. 1B-1D is also considered an acute-angle bend 120. Similarly, for the sake of this invention, a right-angle bend in the shank 100 of approximately 90 degrees is also considered as generally being an acute-angle bend 120. Said differently, for the sake of this invention, a generally acute-angle bend 120 is any bend that is not substantially greater than 90 degrees while simultaneously being substantially less than 180 degrees.

Figure 6A:
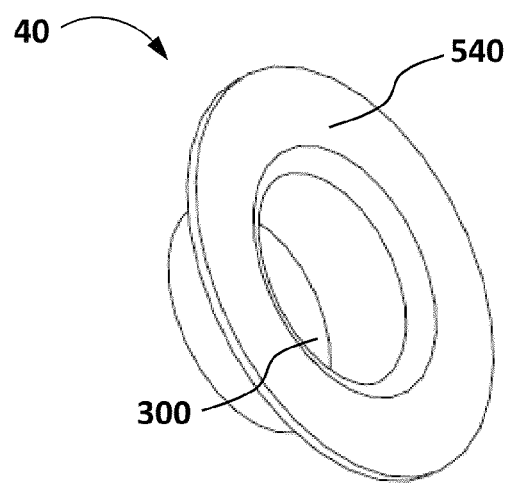
Figure 6B:
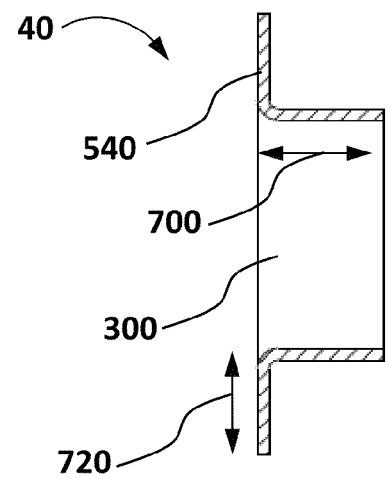

FIG. 6A and FIG. 6B are a perspective view and a median-plane section view, respectively, of an alternate embodiment of a bladed member 40. The bladed member 40 comprises a thin wall 540 and an aperture 300, and generally has an L-shaped wall section having an inner dimension 700 and an outer dimension 720. The L-shaped wall section can also be a slightly slanted-L shape, or a shallow V-shape, such that the wall section is not restricted to just having an exact 90-degree bend. It should be noted that the L-surface having the greater sectional area in FIG. 6B, or the continuous surface comprising the inner dimension 700 and outer dimension 720, is considered the convex side of the L-shaped bladed member 40.

Figure 7A:
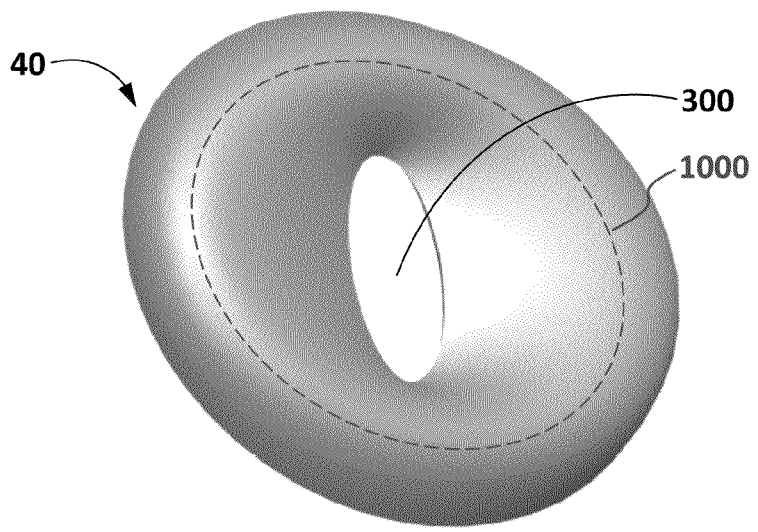
Figure 7B:
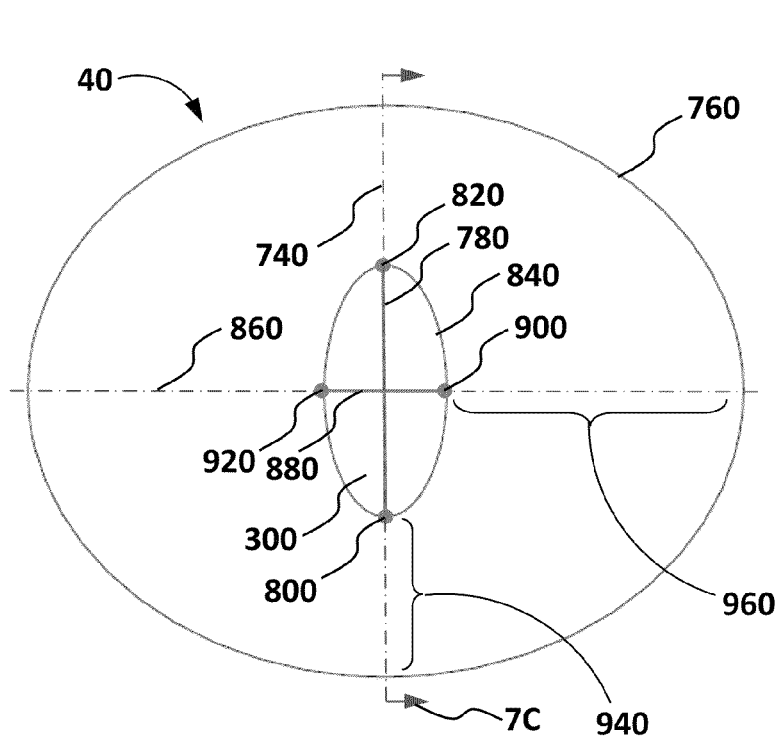
Figure 7C:
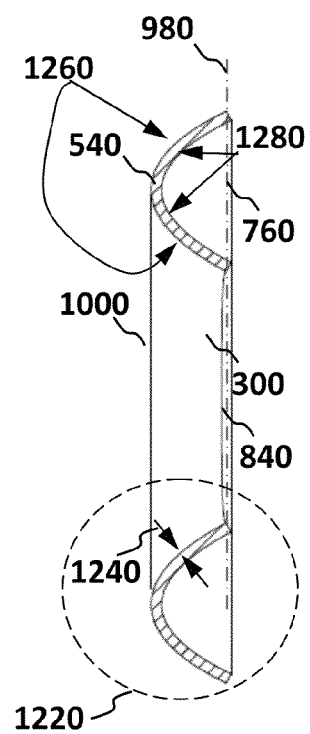

FIGS. 7A-7C illustrate a perspective view, a front view, and a median-plane section view of an alternate embodiment of a bladed member 40 that can enable a more unique oscillating-type motion, in accordance with the present invention. FIG. 7A shows the shape and contour of the bladed member 40, which again comprises a thin wall 540 surrounding an aperture 300. From FIG. 7B, the bladed member 40 comprises a median plane 740 about which the outer perimeter edge 760 of the bladed member 40 is generally symmetric. A first segment 780 is coincident with the median plane 740 and connects a first point 800 to a second point 820, with the first point 800 and second point 820 each located at an intersection of the aperture edge 840 and the median plane 740. A transverse plane 860 of the aperture 300 is generally perpendicular to the median plane 740 and passes through the largest straight-line dimension of the aperture edge 840 that is parallel with the transverse plane 860. The transverse plane 860 is coincident with a second segment 880 connecting a third point 900 to a fourth point 920, such that the third point 900 and fourth point 920 each are located at an intersection of the aperture edge 840 and the transverse plane 860. The transverse plane 860 of this embodiment is also generally parallel with a largest dimension of the bladed member 40, or in other words, generally parallel with the longest chord or longest straight-line dimension connecting two points along the outer perimeter edge 760. Having established these parameters, a first dimension 940 is defined as the straight line distance within the median plane 740 from the first point 800 to the closest location along the outer perimeter edge 760 of the bladed member 40, and a second dimension 960 is defined as the straight line distance within the transverse plane 860 from the third point 900 to the outer perimeter edge 760 of the bladed member 40. From FIG. 7B, it can be seen that the first dimension 940 is smaller than the second dimension 960, and this is the condition that must be met in order to enable the desired oscillating motion of the bladed member 40 of this preferred embodiment. Said differently, and more importantly, this geometric arrangement ensures the hook 60 will generally self-align itself next to either the first point 800 or the second point 820 during the initial movement of the lure 20 and thus orient the broader, transverse portion or "wing" portions of the bladed member 40 into the oncoming water flow, resulting in the desired oscillation magnitude and frequency. If the outer shape of the bladed member 40 were held fixed and the aperture geometry changed such that first dimension 940 and second dimension 960 were equal, then the bladed member orientation and resulting oscillations during lure retrieval would not be as desired compared to those of the arrangement of FIG. 7B. Likewise, if the first dimension 940 were larger than the second dimension 960, then the hook 60 would self-align itself adjacent to either the third point 900 or the fourth point 920, and the resulting oscillations would again not be of the desired magnitude and frequency.

The section view of FIG. 7C provides an additional view of the thin wall 540 and aperture 300 of the bladed member 40. The wall section shape is generally a U-shape, V-shape, or C-shape, with the shape varying dimensionally as the wall section is swept in a generally annular, closed loop shape. Also, it can be seen that the aperture edge 840 and outer perimeter edge 760 generally lie within a same first plane 980, with an annular apex edge 1000 positioned on one side of said first plane 980. The annular apex edge 1000 is also shown as the edge that runs along the general peak, or apex, of the annular trajectory of the arch-shaped section 1220. In FIG. 7C it is evident that the wall section can also be described as a generally arch-shaped section 1220 having a predetermined thickness 1240, and FIGS. 7A-7B show the arch-shaped section 1220 varying in dimensions as the arch-shaped section 1220 sweeps an annular or loop-shaped trajectory defining the outer perimeter edge 760 and inner aperture edge 840. It is also obvious that the arch-shaped section 1220 can be further described as having a generally convex first-arched surface 1260, or first face, facing a first direction. In addition, a generally concave and opposite-arched surface 1280, or opposite face, can be observed, wherein the opposite-arched surface 1280 comprises a generally similar-shaped curvature as the first-arched surface 1260, and the opposite-arched surface 1280 generally faces an opposite direction relative to the first-arched surface 1260.

FIGS. 8A-8C illustrate independent, yet similar, drawing views having similar geometric parameters as FIGS. 7A-7C, but with a bladed member 40 having a differently-shaped outer perimeter edge 760 and having a differently-shaped aperture edge 840. From comparing FIGS. 7A-7C and FIGS. 8A-8C, it should be obvious that the widest portion of the aperture 300, which occurs in a direction parallel with the transverse plane 860, does not necessarily have to pass through the center of, or bisect, the first segment 780. It should also be noted that the transverse plane 860 does not have to necessarily be coincident with the largest chord or dimension across the outer perimeter edge 760 that is parallel to the transverse plane 860. The above statements could be true, for example, if the aperture 300 of FIG. 7B were shifted or translated slightly along the median plane 740, or if the aperture 300 of FIG. 8B were also shifted along the median plane 740 or were a triangular shape instead of a generally circular shape. It should be noted that in FIG. 8C, the aperture edge 840 lies in a different plane than the outer perimeter edge 760. More specifically, the annular apex edge 1000 of the bladed member 40 is located on a first side of a first plane 980 that is generally occupied by the outer perimeter edge 760, while the aperture edge 840 lies on a generally opposite side of said first plane 980. A second plane 1300 is shown in FIG. 8C as a flat surface generally resting against the annular apex edge 1000. Since a plane is geometrically defined as a flat surface passing through at least two points, the second plane 1300 can also be described as a flat surface passing through, or resting against, at least two points along the annular apex edge 1000. FIG. 8C also shows that both the outer perimeter edge 760 and aperture edge 840 both generally lie on, or reside on, a same common side 1320 of the second plane 1300.

FIGS. 9A-9C illustrate three views of an additional embodiment of a bladed member 40, similar to the view orientations of FIGS. 8A-8C and FIGS. 7A-7C; however, the geometric shape is now that of a generally circular ring having a concave-shaped thin wall 540 section defining a generally circular aperture edge 840 and a generally circular outer perimeter edge 760, with the concave-shaped wall section sweeping the entire circumference of the circular ring. To create a more desired oscillating movement of the lure 20 under water, a section or predetermined area of the circumference of the bladed member 40 can comprise a weighted portion 1020. The presence of the weighted portion 1020 shifts the center of gravity of the bladed member 40 towards the weighted portion 1020, which causes the opposite portion, or generally a point along the inner edge located 180 degrees away from the weighted portion 1020, to self-align adjacent to or up against the shank 100 when the lure 20 is retrieved. The weighted portion 1020 is shown as a separate part, and can be glued, soldered, crimped, clamped, welded, brazed, riveted, or rigidly connected to the bladed member 40 through any means known in the art for rigidly joining two materials. Alternatively, the weighted portion 1020 can simply be an elongated tab portion of the same construction or same piece as the circular ring, such that the tab portion is folded over or rolled over into a compact shape at a predetermined location along the outer perimeter edge 760, thus creating single-piece, imbalanced, ring-shape bladed member 40. Similar to other annular-shaped bladed member embodiments described herein, in FIG. 9C it is again shown that the wall section of the bladed member 40 can be described as a generally arch-shaped section 1220 comprising a predetermined thickness 1240 and having a generally convex first-arched surface 1260 facing a first direction. In addition, a generally concave and opposite-arched surface 1280 is shown, wherein the opposite-arched surface 1280 comprises a generally similar-shaped arch curvature as the first-arched surface 1260.

Figure 10A:
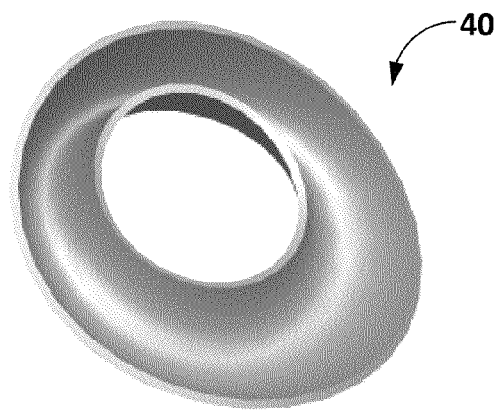
Figure 10B:
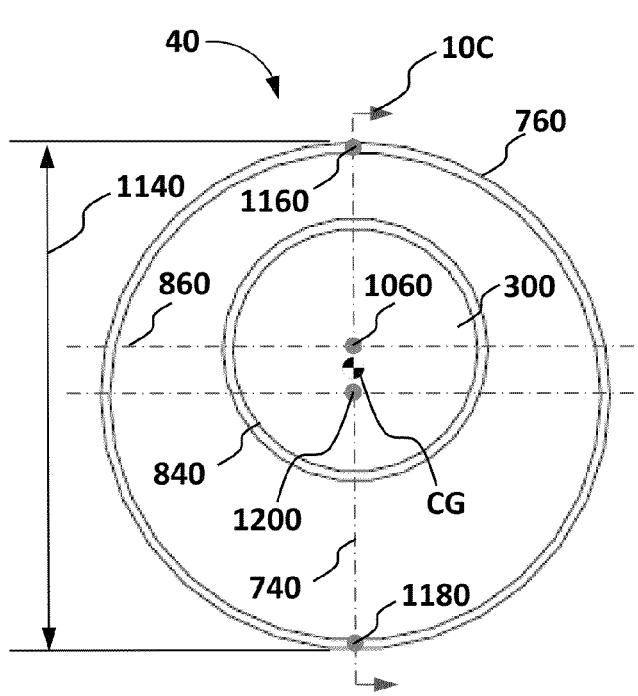
Figure 10C:
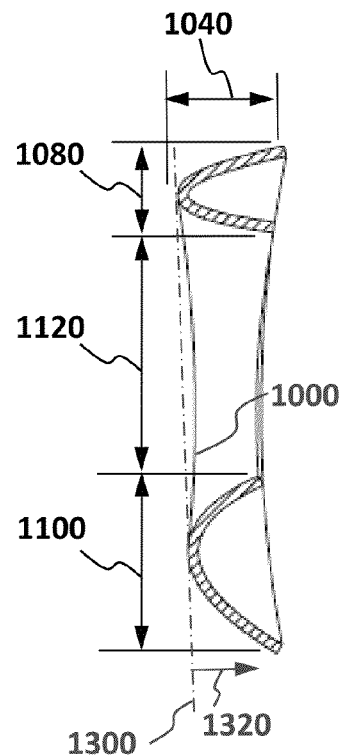

FIGS. 10A-10C illustrate three similar views of an additional bladed member 40 embodiment. The generally ring-shaped bladed member 40 has a varying annular section dimension, discussed below, and a varying annular height dimension 1040. A median plane 740 passes through the aperture center point 1060, which is located along a general centerline of the aperture 300, and the median plane 740 divides the outer perimeter edge 760 of the bladed member 40 into two generally equal portions, with the intersection of the median plane 760 through the bladed member 40 also defining a first section dimension 1080 and a second section dimension 1100. A median plane aperture chord 1120 is defined as a maximum dimension of the aperture 300 that is simultaneously generally coincident with the median plane 740, and the median plane aperture chord 1120 would be the same as a diameter dimension if the aperture edge 840 were a perfect circle, which it is not limited in so being. The bladed member 40 is desirably shaped and dimensioned such that the additive sum of the first section dimension 1080 and second section dimension 1100 is less than the length of the aperture chord 1120. In other words, the length of the aperture chord 1120 is generally greater than half of a median plane projection dimension 1140 of the outer perimeter edge 760, with the median plane projection dimension connecting a first intersection point 1160 and a second intersection point 1180. Note in FIG. 10B that the bladed member 40 is shaped and dimensioned such that the center of gravity CG of the bladed member 40 is located between the aperture center point 1060 and outer perimeter edge center point 1200. To clarify, and for the sake of this invention, the aperture center point 1060 is the point located within the median plane 740 and passing through a transverse plane 860, and the transverse plane 860 passes through the largest dimension of the aperture edge 840 that is perpendicular to the median plane 740. Similarly, for the sake of this invention, the outer perimeter edge center point 1200 is a point located within the median plane 740 and passes through the largest dimension of the outer perimeter edge 760 that is perpendicular to the median plane 740.

With first section dimension 1080 generally smaller than the second section dimension 1100, and with each located within the median plane 740, it should also be understood that it is possible to shape and dimension the aperture 300 and outer perimeter edge 760 of any bladed member 40 such that the center of gravity CG remains located within the median plane 740 but moved forward to be positioned between the aperture center point 1060 and first intersection point 1160. Although not shown by a drawing figure, such a dimensional arrangement of a bladed member 40 would be desirable if an angler preferred a bladed member 40 that resulted in a significantly different oscillating speed or behavior. Note that such location of the center of gravity CG would then be significantly different from the location of the center of gravity CG of the bladed member 40 embodiments shown by FIG. 2B and FIG. 10B.

Again, it is not a requirement that the annular shape of a bladed member 40 be a closed-loop shape. For example, a thin slot could be left between the two ends of an annularly-shaped or ring-shaped bladed member 40, with a width dimension of the thin slot being less than the thickness of the shank 100 in order to detachably mount or snap the bladed member 40 onto a shank 100 or other wire form lure component, similar to the function of the slotted portion of the bladed member 40 of FIG. 3.

It is obvious that the oscillating blade member embodiments described herein can be integrated into pre-existing types of fishing lures as simply a stably-oscillating object used to attract fish, rather than just slidably mounted along a hook shank. For example, while a common spinner-type lure comprises a hook embedded in a weighted head with one end of a generally V-shaped wire form frame rigidly coupled to the weighted head and the opposite end of the V-shaped wire form frame coupled to a pivotally-mounted and freely-rotating spinner, such a freely-rotating spinner can be replaced with an oscillating-type bladed member of an embodiment described herein, such that the bladed member now cyclically vibrates up-and-down or side-to-side, changing the lure from a "spinner-type" lure to an "oscillating-type" lure. This is just one example of integrating the novel blade shapes described herein, or any combination thereof, into pre-existing fishing lure form factors in order to create a new type of oscillating lure.

A largemouth bass, which is a popular game fish, generally has a highest hearing sensitivity to a frequency of around 100 Hertz, meaning a 100 Hertz tone will sound louder, or be interpreted as being louder, to a bass as compared to other frequency tones of the same acoustical amplitude. While 100 Hertz is a relatively challenging frequency to be generated by a purely mechanically vibrating lure in hopes of maximizing the probability that a nearby bass hears the lure, it is more likely that a mechanical lure be able to oscillate at 25 Hertz, for example, during normal lure retrieval speeds of approximately 1.0-5.0 feet per second. With 100 Hertz being the fourth harmonic of 25 Hertz, a lure vibrating at 25 Hertz would also emit a significant fourth harmonic 100-Hertz signal into the surrounding water. Thus, a bladed member, such as those described herein, can be shaped and dimensioned in order to oscillate at approximately 25 times per second when the lure moves through water and correspondingly emit significant acoustical amplitude at the fourth harmonic frequency of 100 Hertz.

It should be understood that there are many variations of the preferred embodiments described herein. A bladed member can be made from a plastic or elastomeric material in addition to the metallic materials previously taught and described. A bladed member can have a varying thickness along any spatial dimension or along an outer perimeter edge, and all of or a portion of a swept wall section of a bladed member can generally comprise a J-shape, U-shape, C-shape, L-shape, V-shape, or a concave shape made from any combination thereof. A bladed member can be formed by combining portions of one embodiment of a bladed member described herein with one or more portions of a different embodiment of a bladed member described herein. A bladed member can comprise additional elements for attracting fish, such a texture or pattern designed to reflect sunlight in a different manner than that of a simply polished or smooth bladed member surface. A bladed member can be substantially flat in construction and does not necessarily have to comprise a concave or convex side. In addition, the outer perimeter edge of bladed member and/or an aperture edge of a bladed member can have a shape that is round, elongated, ovoid, diamond-shaped, or any rounded-type or polygon-type shape that enables the desired side-to-side or up-and-down motion of the bladed member as the lure is retrieved. A bladed member can be folded or bent into a V-shape or U-shape through a generally symmetric bending or curving of the bladed member relative to a median plane or transverse plane. A bladed member can be painted or shaped to comprise any anatomical feature of a small fish, amphibian, mammal, reptile, mollusk, crustacean, bird, or insect. The surface of a bladed member can be coated with plastic or metallic reflective elements, such as glitter, metallic paint, or similar. One or more additional small holes of any shape can be added to a bladed member, in addition to the aperture described herein. An aperture of a bladed member can be coupled to a small ring-shaped member, with the small ring-shaped member then slidably coupled to the shank, such that the bladed member is still constrained from rotating or spinning more than 380 degrees around an imaginary axis that is generally parallel to the direction of lure travel.

Further variations are obvious with regards to the hook and spacer member. The hook can be in the form of a double hook or treble hook in addition to the single hook shown in the previously-described preferred embodiments. In addition to the coil wire mount shown, other means for coupling an elastomeric body member to a hook eyelet include a separate-part wire-type barb pivotally coupled to the eyelet and designed to be inserted into the head of the elastomeric body member. The spacer member can be broader and flatter in shape, such as a disc or plate. Lastly, the lure can further comprise common smaller components such as split rings, quick-change clips, small connectors, swivels, weights, beads, lines, leaders, and the like.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A fishing lure comprising:
    a hook;
    at least one bladed member;
        wherein said at least one bladed member comprises a generally arch-shaped section having a thickness, said generally arch-shaped section sweeping an annular trajectory to define an outer perimeter edge and form a generally convex first-arched surface and a generally concave opposite-arched surface separated by said thickness, said annular trajectory defining an aperture having an aperture edge;
        wherein said outer perimeter edge and said aperture edge generally lie within a same plane;
    a means for coupling said at least one bladed member to said hook; and
    wherein said first-arched surface has a symmetry about a median plane, said symmetry enabling a stable back-and-forth oscillating behavior, and not a spinning rotational behavior, of said at least one bladed member as said lure is pulled forward in water.

2. The fishing lure in accordance with claim 1, wherein a weighted member is coupled to said hook.

3. The fishing lure in accordance with claim 1, wherein a spacer member surrounds a section of said hook.

4. The fishing lure in accordance with claim 1, wherein said bladed member is detachably mounted to said hook.

5. The fishing lure in accordance with claim 1, wherein said bladed member comprises a weighted portion.

6. The fishing lure in accordance with claim 1, wherein said arch-shaped section varies along said annular trajectory.

7. The fishing lure in accordance with claim 1, wherein said lure further comprises an element for attracting fish.

8. A fishing lure comprising:
    a hook;
    at least one bladed member;
        wherein said at least one bladed member comprises a generally variable arch-shaped section having a thickness, said generally variable arch-shaped section sweeping a loop-shaped trajectory to define a generally convex first-arched surface and a generally concave opposite-arched surface separated by said thickness, said at least one bladed member having an aperture;
    a means for coupling said at least one bladed member to said hook; and
    wherein said at least one bladed member is generally symmetric about a median plane and exhibits a stable back-and-forth oscillating behavior, and not a spinning rotational behavior, as said lure is pulled forward in water.

9. The fishing lure in accordance with claim 8, wherein a weighted member is coupled to said hook.

10. The fishing lure in accordance with claim 8, wherein a spacer member surrounds a section of said hook.

11. The fishing lure in accordance with claim 8, wherein said bladed member is detachably mounted to said hook.

12. The fishing lure in accordance with claim 8, wherein said bladed member comprises a weighted portion.

13. The fishing lure in accordance with claim 8, wherein said arch-shaped section has a generally J-shape, U-shape, C-shape, L-shape, V-shape, or any combination thereof.

14. The fishing lure in accordance with claim 8, wherein said lure further comprises an element for attracting fish.

15. A fishing lure comprising:
    a metal wire;
    at least one bladed member;
        wherein said at least one bladed member comprises an arch-shaped section having a general peak, said arch-shaped section sweeping a loop-shaped trajectory to define an outer perimeter edge and form a first-arched surface surrounding an aperture having an aperture edge;

wherein said peak of said arch-shaped section defines an apex edge as said arch-shaped section sweeps along said loop-shaped trajectory;

wherein a plane generally rests against at least two points on said apex edge;

wherein said outer perimeter edge and said aperture edge both reside on a same common side of said plane;

wherein said metal wire passes wholly through said aperture and is slidably coupled to said at least one bladed member; and wherein said at least one bladed member exhibits a stable back-and-forth oscillating behavior, and not a spinning rotational behavior, as said lure is pulled forward in water.

16. The fishing lure in accordance with claim 15, wherein said metal wire is a hook.

17. The fishing lure in accordance with claim 16, wherein a weighted member is coupled to said hook.

18. The fishing lure in accordance with claim 15, wherein said bladed member comprises a weighted portion.

19. The fishing lure in accordance with claim 15, wherein said arch-shaped section has a generally J-shape, U-shape, C-shape, L-shape, V-shape, or any combination thereof.

20. The fishing lure in accordance with claim 15, wherein said lure further comprises an element for attracting fish.

* * * * *